United States Patent [19]

Naruke et al.

[11] Patent Number: 4,916,595
[45] Date of Patent: Apr. 10, 1990

[54] AUTOMOTIVE CABIN LIGHT UNIT WITH VANITY MIRROR

[75] Inventors: Masao Naruke; Hideyuki Hayashi, both of Kanagawa, Japan

[73] Assignee: Nissan Motor Company, Limited, Yokohama, Japan

[21] Appl. No.: 266,768

[22] Filed: Nov. 3, 1988

[30] Foreign Application Priority Data

Nov. 16, 1987 [JP] Japan .................. 62-287523

[51] Int. Cl.⁴ ................. F21V 33/00; B60Q 1/00
[52] U.S. Cl. ........................... 362/142; 362/74
[58] Field of Search ............... 362/135, 138, 139, 142, 362/143, 144, 80; 132/296, 304, 316; 296/97.1, 97.5

[56] References Cited

U.S. PATENT DOCUMENTS

| | | | |
|---|---|---|---|
| 2,319,745 | 5/1943 | Napoli | 362/135 |
| 4,421,355 | 12/1983 | Marcus | 362/135 |
| 4,628,417 | 12/1986 | Kaminski et al. | 362/80 |
| 4,734,831 | 3/1988 | Keyser et al. | 362/142 |

Primary Examiner—Ira S. Lazarus
Assistant Examiner—Peggy H. Neils
Attorney, Agent, or Firm—Pennie & Edmonds

[57] ABSTRACT

A cabin light unit for an automotive vehicle includes a vanity mirror section arranged at a location adjoining a cabin light source. The vanity mirror section is pivotably supported on a supporting plate via a stay so as to be movable between a housed position in which the vanity mirror faces the supporting plate, and an operating position in which the vanity mirror section projects from the supporting plate. The stay has a plurality of pivotal axes so that any desired positioning and directional orientation of the vanity mirror can be achieved.

10 Claims, 9 Drawing Sheets

4,916,595

AUTOMOTIVE CABIN LIGHT UNIT WITH VANITY MIRROR

BACKGROUND OF THE INVENTION

1. Field of The Invention

The present invention relates generally to a cabin light unit for automotive vehicles. More specifically, the invention relates to an automotive cabin light unit which can be used as an illumination for a vanity mirror.

2. Description of The Prior Art

In typical automotive vehicles, a vanity mirror is provided at a location which is not close to the cabin light. For example, the cabin light is mounted on a roof panel at essentially the center portion thereof, while the vanity mirror is installed on either the roof panel at the frontward portion thereof or a sun visor. Although such cabin lights can effectively light the vehicular cabin, they can not sufficiently direct the light towards the face of the person using the vanity mirror.

Some of vanity mirrors which are installed on the sun visor are equiped with a personal light for directing light on the subject. However, the direction of the mirror is confined to the narrow limits in which the sun visor can be oriented, and only the occupant in the front seat can use the vanity mirror.

SUMMARY OF THE INVENTION

It is therefore a principal object of the present invention to provide an automotive cabin light unit which is equiped with a vanity mirror.

It is another object of the invention to provide an automotive cabin light unit which can be used as illumination for the vehicular compartment as well as for a vanity mirror.

It is a further object of the invention to provide an automotive cabin light with a vanity mirror which can be used by the occupants in the front seat as well as the rear seat.

In order to accomplish the aforementioned and other specific objects, the cabin light unit includes a vanity mirror arranged at a location adjoining a cabin light source.

According to one aspect of the present invention, the cabin light unit for an automotive vehicle comprises:
a base plate fixed in the vehicular compartment;
a light section mounted on the base plate, the light section having a light source for directing the light into the vehicular compartment, and a light lens for covering the light source;
a mirror section having a mirror holder supported on the base plate and a vanity mirror held by the mirror holder, the mirror holder being movable between a first position in which the vanity mirror is arranged essentially horizontally, and a second position in which the vanity mirror is arranged essentially vertically.

The mirror holder may be pivotally supported on the base plate, and the direction of the vanity mirror may be changed by rotation of the mirror holder. The mirror holder may be detachable from the base plate.

According to another aspect of the invention. the cabin light unit for an automotive vehicle comprises:
a base plate fixed in the vehicular compartment;
a light section installed on the base plate, the light section having a light source for directing the light into the vehicular compartment, and a light lens for covering the light source; and
a mirror section having a vanity mirror, a mirror holder for holding the vanity mirror, and a stay member for connecting said mirror holder to the base plate, one end of the stay member being pivotably supported on the base plate, and the other end of the stay member being pivotably connected to the mirror holder, the mirror holder being movable between a first position in which the vanity mirror is arranged essentially parallel to said base plate, and a second position in which the vanity mirror is arranged essentially perpendicularly to the base plate.

The stay member may be comprised of a first stay segment which is supported on the base plate so as to be pivotable around a first axis parallel to the base plate, and a second stay segment which supports the mirror holder to allow the holder to rotate around a second axis parallel to the first axis, the second stay segment engaging the first stay segment so as to be rotatable around a third axis perpendicular to the first and second axes. One of first and second stay segments may be provided with a projecting portion which extends along a longitudinal axis, and the other segment may be formed with a first opening which rotatably engages the projecting portion so as to allow the rotation around the third axis. The projecting portion may be detached from the opening when an excessive load is applied to the mirror holder. The projecting portion has an engaging portion, and the other segment may have an engaging member which is biased into engagement with the engaging portion by the thrusting force of a spring. The projecting portion may also have a first engaging portion and be bisected by slot extending in the longitudinal direction, and the other segment may also have a second engaging portion which engages the first engaging portion. One end of the stay member may also have a substantially spherical member which engages the base plate in a manner of a ball-and socket joint. In this case, the spherical member of the stay member is disengageable from the base plate when an excessive load is applied to the mirror holder.

DESCRIPTION OF THE FIRST PREFERRED EMBODIMENT

Figure 1:
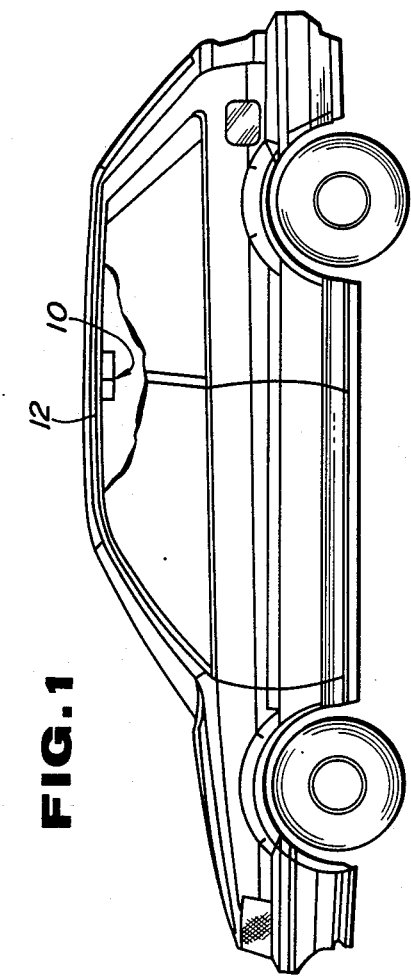
FIG. 1 is a side view of an automotive vehicle in which a cabin light unit according to the present invention is provided.

Referring now to the drawings, particularly to FIGS. 1 to 10, the first preferred embodiment of an automotive cabin light unit according to the present invention is described below.

Figure 2:
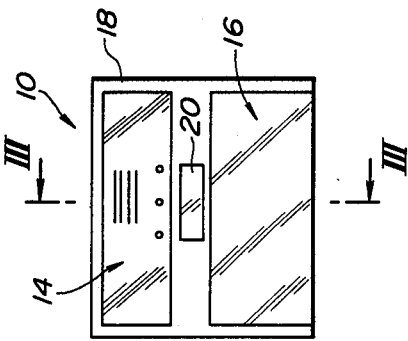
FIG. 2 is a plan view of a cabin light unit according to the first preferred embodiment of the present invention.
Figure 4:
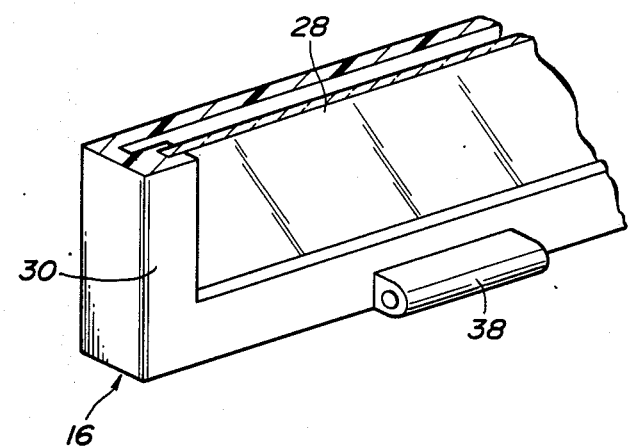
FIG. 4 is a partially cutaway view of a mirror holder of the cabin light unit of FIG. 2.

As shown in FIG. 1, a cabin light unit 10 is installed on a roof panel 12 of an automotive vehicle at essentially the center portion thereof. As shown in Fig.2, the cabin light unit 10 comprises a light section 14 and a mirror section 16. The light section 14 and the mirror section 16 are mounted on the roof panel 12 via a base plate 18. The light section 14 is arranged at the frontward portion of the base plate 18, and the mirror section 16 is arranged at the rearward portion thereof so as to adjoin the light section 14. A manually operable light switch 20 is mounted on the base plate 18 between the light section 14 and the mirror section 16.

Figure 3:
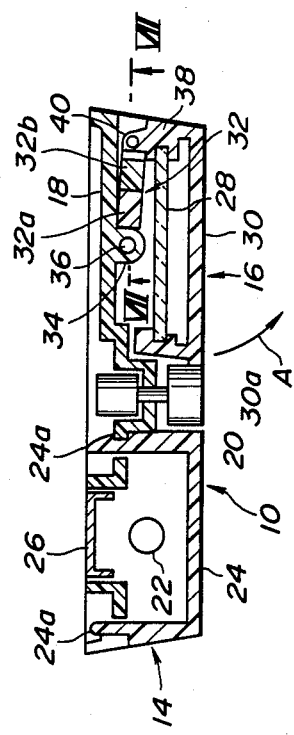
FIG. 3 is a section view of the cabin light unit taken along the line III—III o FIG. 2.

As shown in FIG. 3, the light section 14 comprises an electric-light bulb 22, an essentially box-shaped light lens 24 which defines a bulb housing together with the base plate 18, and a bulb cover 26 which is inserted into an opening formed in the base plate 18 and which covers the upper portion of the electric-light bulb 22. The light lens 24 is provided with a claw serving as an engaging portion 24a on the edge thereof so as to be disengageable from the base plate 18.

The mirror section 16 comprises a vanity mirror 28, a mirror holder 30 which supports the vanity mirror 28, and a stay 32 which connects the mirror holder 30 to the base plate 18. As seen clearly from FIG. 4, the edges of the vanity mirror 28 engage grooves formed in the inner peripheries of the mirror holder 30. The mirror holder 30 is provided with a flange 30a on the opposite edge from the stay 32, so as to be easily manipulated by the occupant's fingers. The mirror holder 30 is pivotably, foldably and detachably supported by the stay 32, as will be described hereafter.

Figure 5:
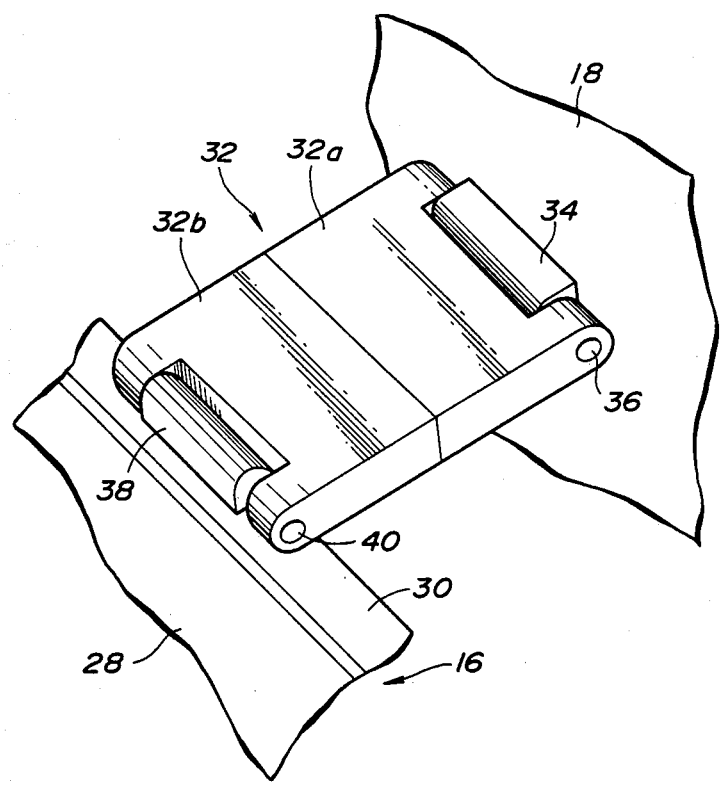
FIG. 5 is a perspective view of a stay of the cabin light unit of FIG. 2.

As seen clearly from Fig.5, one end of the stay 32 is pivotably connected to a connecting portion 34 which is integrally formed on the base plate 18, via a connecting pin 36. The other end thereof is pivotably connected to a connecting portion 38 which is integrally formed on the edge of mirror holder 30 at essentially the center portion thereof, via a connecting pin 40.

Figure 6:
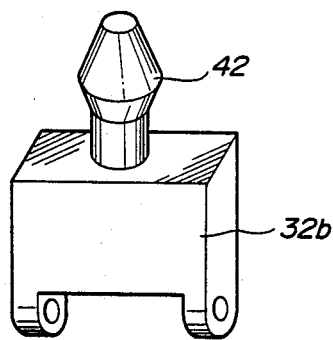
FIG. 6 is a perspective view of one of stay segments of the stay of FIG. 5.
Figure 7:
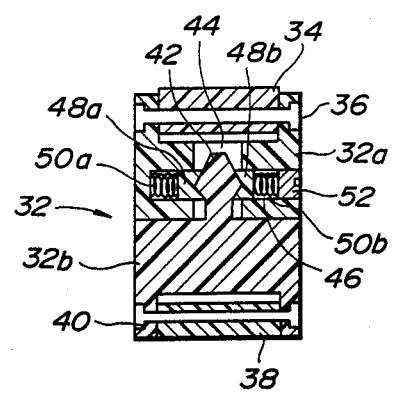
FIG. 7 is a section view of the stay of FIG. 5 taken along the line VII—VII of FIG. 3.
Figure 8:
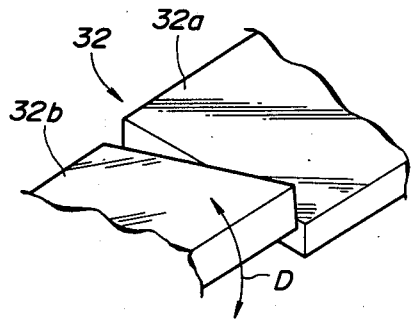
FIG. 8 is a perspective view of the stay of FIG. 5, which illustrates the rotation of the stay.
Figure 9:
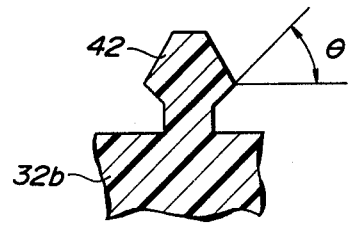
FIG. 9 is a sectional view of the stay segment of FIG. 6.

The stay 32 is comprised of stay segments 32a and 32b. The stay segment 32a is connected to the connecting portion 34 of the base plate 18 and the stay segment 32b is connected to the connecting portion 38 of the mirror holder 30. As shown in FIG. 6, the stay segment 32b is integrally formed with a projecting portion 42 which vertically projects from the surface facing the stay segment 32a and which has a large outer diameter portion. As shown in FIG. 7, the stay segment 32a is formed with a vertically extending opening 44 for receiving the projecting portion 42 of the stay segment 32b, and side openings 46 which extend perpendicularly to the vertically extending opening 44. The side openings 46 receive engaging members 48a and 48b which are engageable with the side surfaces of the projecting portion 42. The engaging members 48a and 48b are thrusted against the side surfaces of the projecting portion 42 by means of coil springs 50a and 50b. In order to adjust the thrusting force of the coil springs 50a and 50b, an adjustment screw 52 engages the open end of one of the side openings 46. When the projecting portion 42 of the stay segment 32b is inserted into the vertically extending opening 44, it engages the engaging members 48a and 48b. As a result, the stay segment 32b is connected to the stay segment 32a so as to be rotatable in the directions indicated by the arrow D of FIG. 8. That is, the pivoting axis of the connection between the stay segments 32a and 32b is perpendicular to the pivoting axes of the connections between the stay segment 32a and the base plate 18, and between the stay segment 32b and the mirror holder 30. If an excessive load is applied to the mirror holder 30, the stay segment 32b can detach from the stay segment 32a. The value of the load, by which the stay segment 32b is detached from the stay segment 32a, can be determined by selection of the angle θ of the inclined surface of the projecting portion 42 shown in FIG. 9, and by adjusting the thrusting force of the coil springs 50a and 50b by means of the adjustment screw 52.

Figure 10:
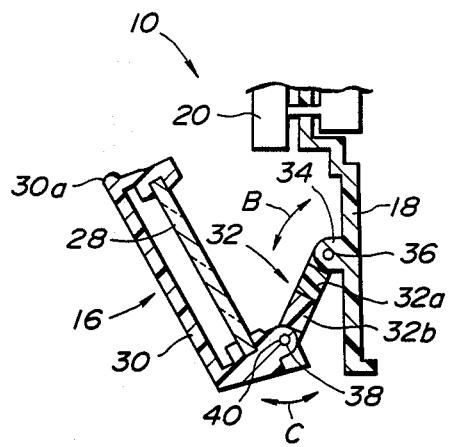
FIG. 10 is a section view of the mirror holder of the cabin light unit of FIG. 2, which illustrates the movement of the mirror holder.

In the aforementioned construction, the mirror holder 30 is pivotably, foldably and detachably supported by the base plate 18 as shown in FIG. 10.

Figure 11:
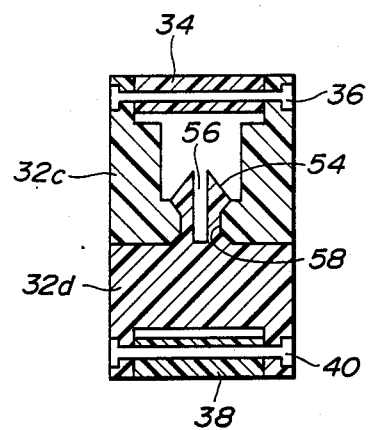
FIG. 11 is a section view of another embodiment of a stay which can be used for the cabin light unit according to the first preferred embodiment.
Figure 12:
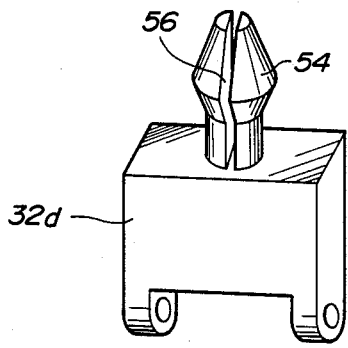
FIG. 12 is a perspective view of the stay segment of the stay of FIG. 11.

In a variation of the first embodiment of the present invention, stay segments 32c and 32d shown in FIGS. 11 and 12 are substituted for the stay segments 32a and 32b. The stay segment 32d is integrally formed with a projecting portion 54 which has essentially the same shape of outer surface as that of projecting portion 42. The projecting portion 54 is formed with a slot 56 which extends in a direction of the axis of the projecting portion 54, so as to give the lateral elasticity to the projecting portion 54. The stay segment 32c is formed with a vertically extending opening 58 which is engageable with the projecting portion 54 of the stay segment 32d. By inserting the projecting portion 54 into the vertically extending opening 58, the stay segment 32d can be detachably connected to the stay segment 32c. In this engagement, it is not required to use the engaging members 48a and 48b and the coil springs 50a and 50b.

The operation of the first embodiment of the present invention is described below.

To use the vanity mirror, the mirror holder 30 is pulled in a direction of the arrow A of FIG. 3. As shown in FIG. 10, the stay 32 is rotated around the connecting pin 36 in a direction of the arrow B, and the mirror holder 30 is rotated around the connecting pin 38 in a direction of the arrow C. As a result, the vanity mirror 28 can be moved backward and forward, and upward and downward to be adjusted to a desired position. In addition, the vanity mirror 28 can be adjusted to face any desired direction, since the stay segment 32b or 32d is rotatably supported by the segment 32a or 32c via the projecting portion 42 or 54.

As mentioned above, according to the present invention, the vanity mirror 28 can be easily moved backward and forward, and upward and downward to be adjustable to a desired position, and adjusted to face any desired direction, in a one-handed operation. Therefore, the occupants on the front and rear seats can use the vanity mirror 28 at any desired position and direction. In addition, the cabin light source 22 can be used as an illumination for the vanity mirror 28 since the light section 14 is arranged at a location adjoining the mirror section 16. Therefore, complicated electrical wiring and additional lights are not required, as in conventional vanity mirrors mounted on the sun visor and having a personal light.

In cases where an excessive load is applied to the mirror holder 30, for example, when the occupant pulls too hard on the mirror holder 30, a child hangs on the mirror holder 30, or the occupant's clothes re caught by the mirror holder 30, then the projecting portion 42 or 54 of the stay segment 32b or 32d connected to the mirror holder 30 detaches from the vertically extending opening 44 or 58 of the stay segment 32a or 32c connected to the mounting member 18. Therefore, it is possible to prevent damage to the cabin light unit 10 or the occupant's clothes, and to prevent deformation of the roof panel 12.

In addition, the top surfaces of the light lens 24, the switch 20 and the mirror housing 30 are arranged on the essentially same surface as each other when the mirror holder 30 is housed in the base plate 18. Therefore, the degree to which the cabin light unit projects from the roof panel can be kept relatively small.

DESCRIPTION OF THE SECOND PREFERRED EMBODIMENT

FIGS. 13 to 17 illustrate the second preferred embodiment of a cabin light unit according to the present invention.

Figure 13:
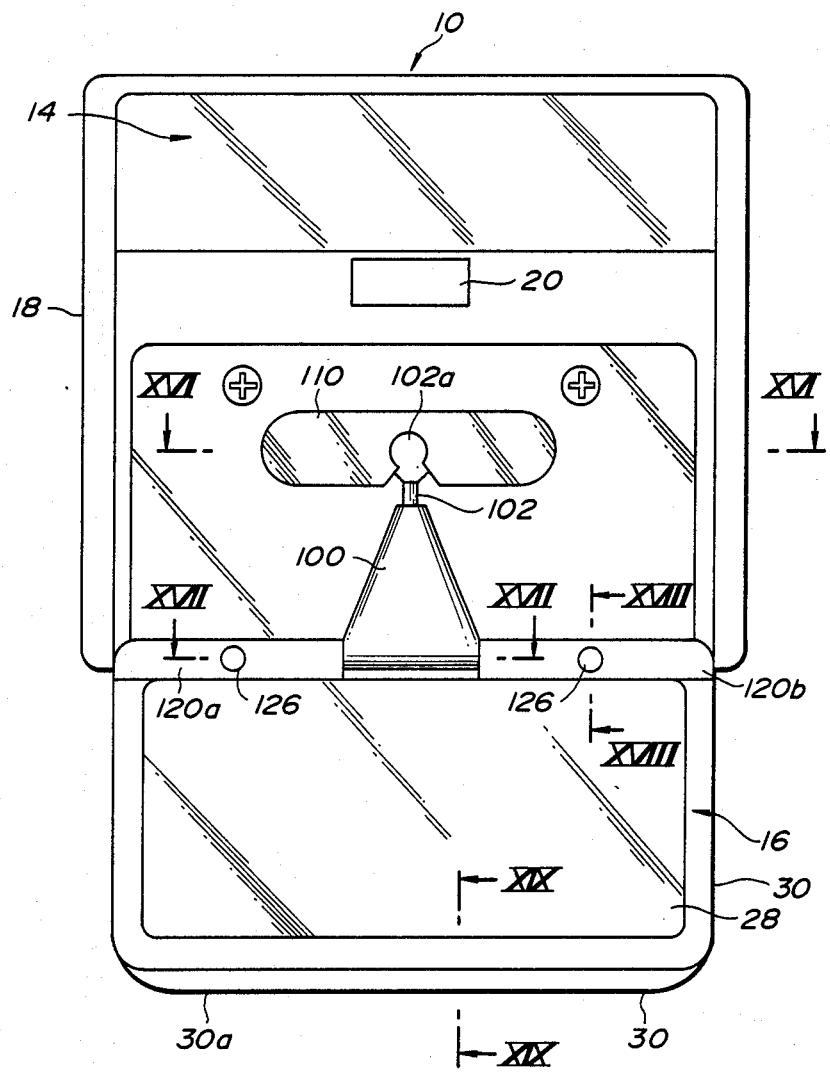
FIG. 13 is a plan view of a cabin light unit according to the second preferred embodiment of the present invention.
Figure 14:
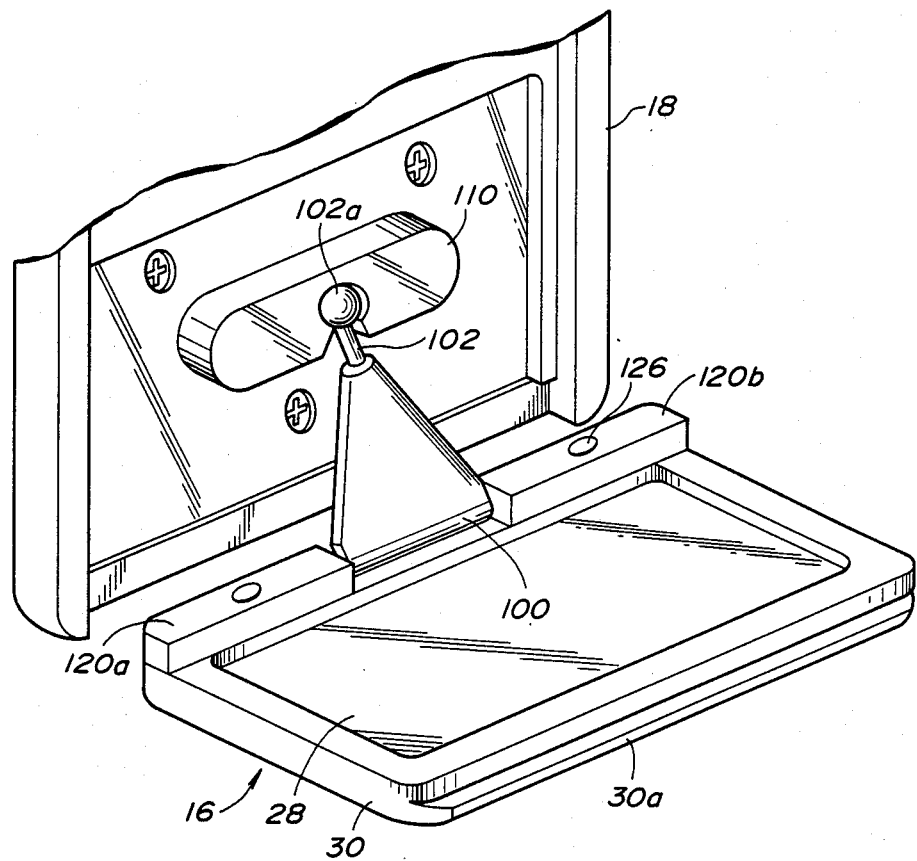
FIG. 14 is a perspective view of the cabin light unit of FIG. 13.

As shown in FIGS. 13 and 14, the cabin light unit 10 comprises the light section 14 and the mirror section 16 similar to the first embodiment of the invention. The mirror holder 30 is pivotably connected to one end of a stay 100. The other end of the stay 100 is pivotably connected to the base plate 18 via a ball-joint member 102.

Figure 15:
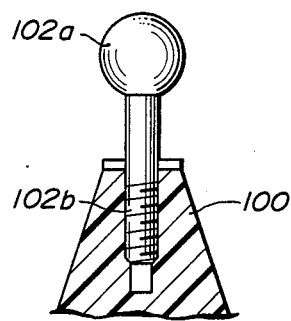
FIG. 15 is a view illustrating the engagement of a stay with a ball-joint member which are the cabin light unit of FIG. 13.

As can be seen clearly from FIG. 15, The ball-joint member 102 comprises an essentially spherical ball portion 102a and a screw portion 102b. The screw portion 102b engages an opening formed in the end of the stay 100.

Figure 16:
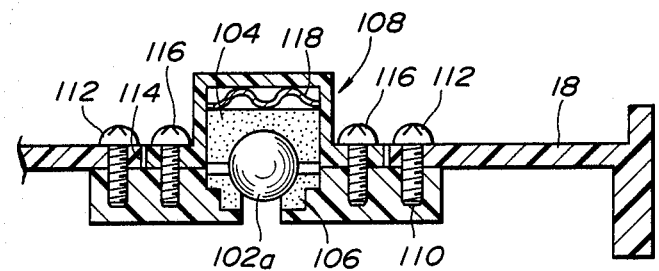
FIG. 16 is a section view of the cabin light unit taken along the line XVI—XVI of FIG. 13.

As can be seen clearly from FIG. 16, the ball portion 102a of the ball-joint member 102 is clamped by upper and lower socket members 104 and 106 which are made of resin. In addition, the upper and lower socket members 104 and 106 are clamped by upper and lower mounting members 108 and 110. The lower mounting member 110 is fixed to the base plate 18 by means of screws 112. The upper mounting member 108 is inserted into a through opening 114 formed in the base plate 18 and is fixed to the lower mounting member 110 via screws 116. A waved spring 118 is inserted into a space defined by the inner surface of the upper mounting member 108 and the upper socket member 104. The waved spring 118 exerts thrusting force against the upper socket member 104, so that the ball portion 102a of the ball-joint member 102 is securely clamped by the upper and lower socket members 104 and 106.

Figure 17:
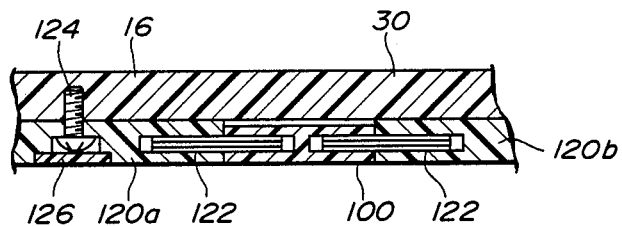
FIG. 17 is a section view of the cabin light unit taken along the line XVII—XVII of FIG. 13.

FIG. 17 illustrates the pivotal engagement of the mirror holder 30 with the stay 100. The end of the stay 100 is pivotably supported by the hinge holders 120a and 120b by means of a pair of spring pins 122. The hinge holders 120a and 120b are fixed to the edges of the mirror holder 30 by means of screws 124. The screws 124 are covered with covers 126 for cosmetic appeal.

Figure 18:
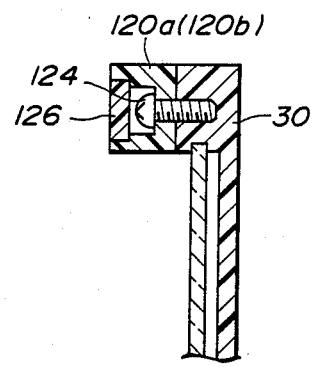
FIG. 18 is a partially cutaway view in section taken along the line XVIII—XVIII of FIG. 13.
Figure 19:
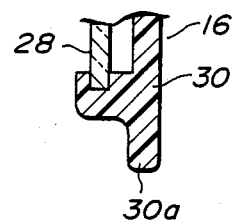
FIG. 19 is a partially cutaway view in section taken along the line XIX—XIX of FIG. 13.

As shown in FIGS. 18 and 19, the edges of the vanity mirror 28 engage grooves formed in the inner peripheries of the mirror holder 30 similar to the first embodiment of the invention.

In the above mentioned construction, the mirror holder 30 is pivotably and foldably supported by the mounting member 18.

Figure 20:
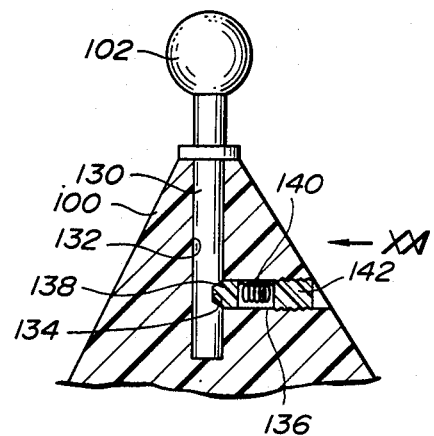
FIGS. 20 to 24 are views illustrating other embodiments of the engagement of the stay with the ball-joint member which are the cabin light unit of FIG. 13.
Figure 21:
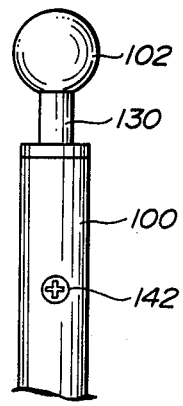

According to the second preferred embodiment of the invention, the stay 100 may be attached to the ball-joint member 102 in the manner shown in FIGS. 20 and 21. In this embodiment, the ball-joint member 102 is integrally formed with a shaft 130. The shaft 130 is received in an opening 132 which is formed in the tip of the stay 100. The shaft 130 is provided with a cut-out 134. The stay 100 is formed with another opening 136 which extends perpendicularly to the opening 132. The cut-out 134 is engageable with a stopper 138 which is received in the opening 136. The stopper 138 is thrusted into the cut-out 130 by means of a coil spring 140. In order to adjust the thrusting force of the coil spring 140, an adjustment screw 142 threaded into the opening 136 engages the other end of the coil spring 140.

Figure 22:
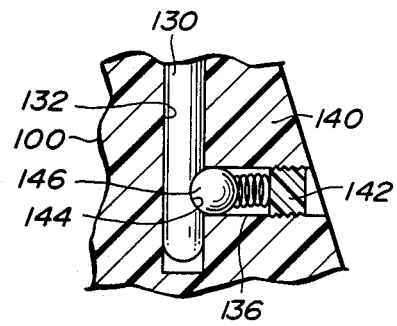

FIG. 22 illustrates another embodiment of the connection between the stay 100 and the ball-joint member 102. In this embodiment, as a substitute for the cut-out 134, a hemispherical recess 144 is formed in the shaft 130, and a spherical steel stopper 146 substituted for the stopper 138 is received in the opening 136.

Figure 23:
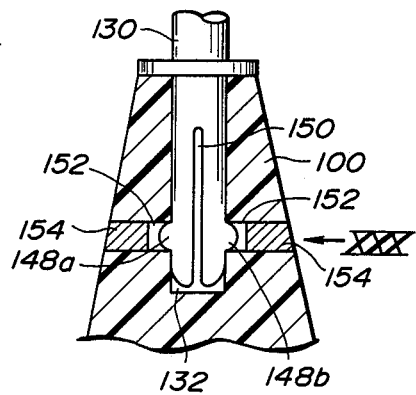
Figure 24:
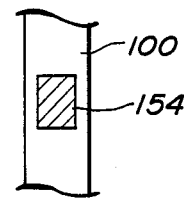

FIGS. 23 and 24 illustrates another embodiment of the connection of the stay 100 with the ball-joint member 102. In this embodiment, the shaft 130 is provided with a pair of projections 148a and 148b, and is formed with a slot 150 which extends along the axis of the shaft 130. The stay 100 is formed with a laterally extending openings 152 which receive the projections 148a and 148b, respectively. The free ends of the openings 152 are closed by stoppers 154 for cosmetic appeal.

According to the second preferred embodiment, in cases where an excessive load is applied to the mirror holder 30, the ball-joint member 102 detaches from the fixing member 106 so that the mirror holder 30 is detached from the mounting member 18. In the case of the constructions shown in FIGS. 20 to 24, the shaft 130 is removed from the opening 132.

Figure 25:
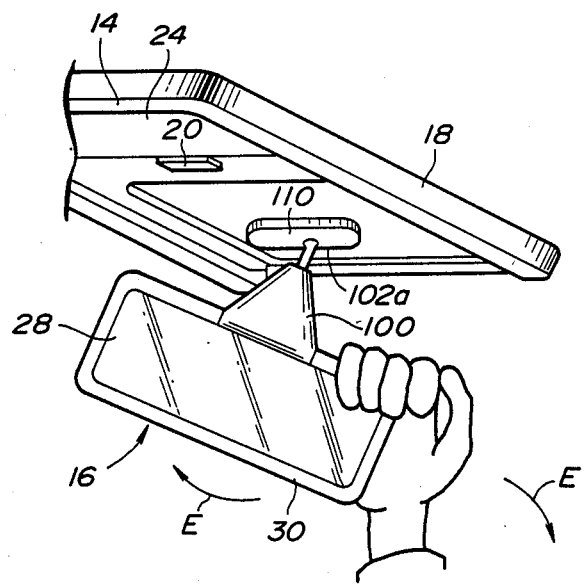
FIG. 25 is a perspective view of the cabin light unit of FIG. 13 when the mirror holder is pulled out.

According to the second preferred embodiment, since the ball-joint member 102 can be freely rotated through 360 degrees, in cases where, as shown in Fig. 25, a load is applied to the mirror holder 30 at one side of the top edges, the mirror holder 30 is rotated along the arrow E, so that the mirror holder 30 receives no damage and the roof panel is not deformed.

What is claimed is:

1. A cabin light unit for an automotive vehicle comprising:
   a base plate installed on a roof panel of the automotive vehicle at essentially the center portion thereof;
   a light section mounted on the base plate, said light section having a light source for directing the light into the vehicular compartment, and a light lens for covering the light source;
   a mirror section having a mirror holder supported on said base plate and a vanity mirror held by the mirror holder, said mirror holder being pivotably supported on the base plate so as to be rotatable around at least two axes with respect to the base plate, one of which is parallel to the base plate and the other of which is perpendicular to the base plate.

2. A cabin light unit for an automotive vehicle comprising:
   a base plate installed on a roof panel of the automotive vehicle at the center portion thereof;
   a light section installed on the base plate, said light section having a light source for directing light into the vehicular compartment, and a light lens for covering the light source; and
   a mirror section having a vanity mirror, a mirror holder for holding the vanity mirror, and a stay member for connecting said mirror holder to said base plate, open end of the stay member being pivotably supported on said base plate, and the other end of the stay member being pivotably connected to said mirror holder, said mirror holder being movable between a first position in which said vanity mirror is arranged essentially parallel to said base plate, and a second position in which said vanity mirror is arranged essentially perpendicularly to said base plate, and said mirror holder being rotatable around at least two axes with respect to the base plate, one of which is parallel to the base plate and the other of which is perpendicular to the base plate.

3. A cabin light unit for an automotive vehicle comprising:
   a base plate fixed in the vehicular compartment;
   a light section installed on the base plate, said light section having a light source for directing light into the vehicular compartment, and a light lens for covering the light source; and
   a mirror section having a vanity mirror, a mirror holder for holding the vanity mirror, and a stay member for connecting said mirror holder to said base plate, one end of the stay member being pivotably supported on said base plate, and the other end of the stay member being pivotably connected to said mirror holder, said mirror holder being movable between a first position in which said vanity mirror is arranged essentially parallel to said base plate, and a second position in which said vanity mirror is arranged essentially perpendicularly to said base plate, said stay member being comprised of a first stay segment which is supported on the base plate so as to be pivotable around a first axis parallel to the base plate, and a second stay segment which supports said mirror holder to allow the holder to rotate around a second axis parallel to the first axis, said second stay segment engaging said first stay segment so as to be rotatable around a third axis perpendicular to the first and second axes.

4. A cabin light unit as set for the in claim 3, wherein one of first and second stay segments is provided with a projecting portion which extends along a longitudinal axis, and the other segment is formed with a first opening which rotatably engages said projecting portion so as to allow rotation around said third axis.

5. A cabin light unit as set forth in claim 4, wherein said projecting portion detaches from said opening when an excessive load is applied to said mirror holder.

6. A cabin light unit as set forth in claim 5, wherein said projecting portion has an engaging portion, and said other segment has an engaging member which is biased into engagement with said engaging portion by the thrusting force of a spring.

7. A cabin light unit as set forth in claim 5, wherein said projecting portion has a first engaging portion and is bisected by a slot extending in the longitudinal direction, and said other segment has a second engaging portion which engages said first engaging portion.

8. A cabin light unit as set forth in claim 2, wherein one end of said stay member has a substantially spherical member which engages said base plate in a manner of a ball-and-socket joint.

9. A cabin light unit as set forth in claim 8, wherein said spherical member of the stay member disengages from said base plate when an excessive load is applied to said mirror holder.

10. A cabin light unit as set forth in claim 1, wherein said mirror holder is detachable from said base plate.

* * * * *

UNITED STATES PATENT AND TRADEMARK OFFICE
CERTIFICATE OF CORRECTION

PATENT NO. : 4,916,595
DATED : April 10, 1990
INVENTOR(S) : Masao NARUKE, Hideyuki HAYASHI It is certified that error appears in the above-identified patent and that said Letters Patent is hereby corrected as shown below:

On the title page:

At Item 73, "Assignee", on the first page of the patent, please add the name of --ICHIKOH INDUSTRIES LIMITED, TOKYO, JAPAN-- so that both Assignees will be indicated: Nissan Motor Company, Limited, and Ichikoh Industries Limited.

Signed and Sealed this

Nineteenth Day of May, 1992

Attest:

DOUGLAS B. COMER

*Attesting Officer*   *Acting Commissioner of Patents and Trademarks*